Oct. 10, 1950

J. T. JACKSON 2,525,357

TRACTOR HITCH CONTROL

Filed Oct. 7, 1949

INVENTOR.
John T. Jackson
BY
McMorrow, Berman & Davidson
Attorneys

Oct. 10, 1950 — J. T. JACKSON — 2,525,357
TRACTOR HITCH CONTROL
Filed Oct. 7, 1949 — 2 Sheets-Sheet 2
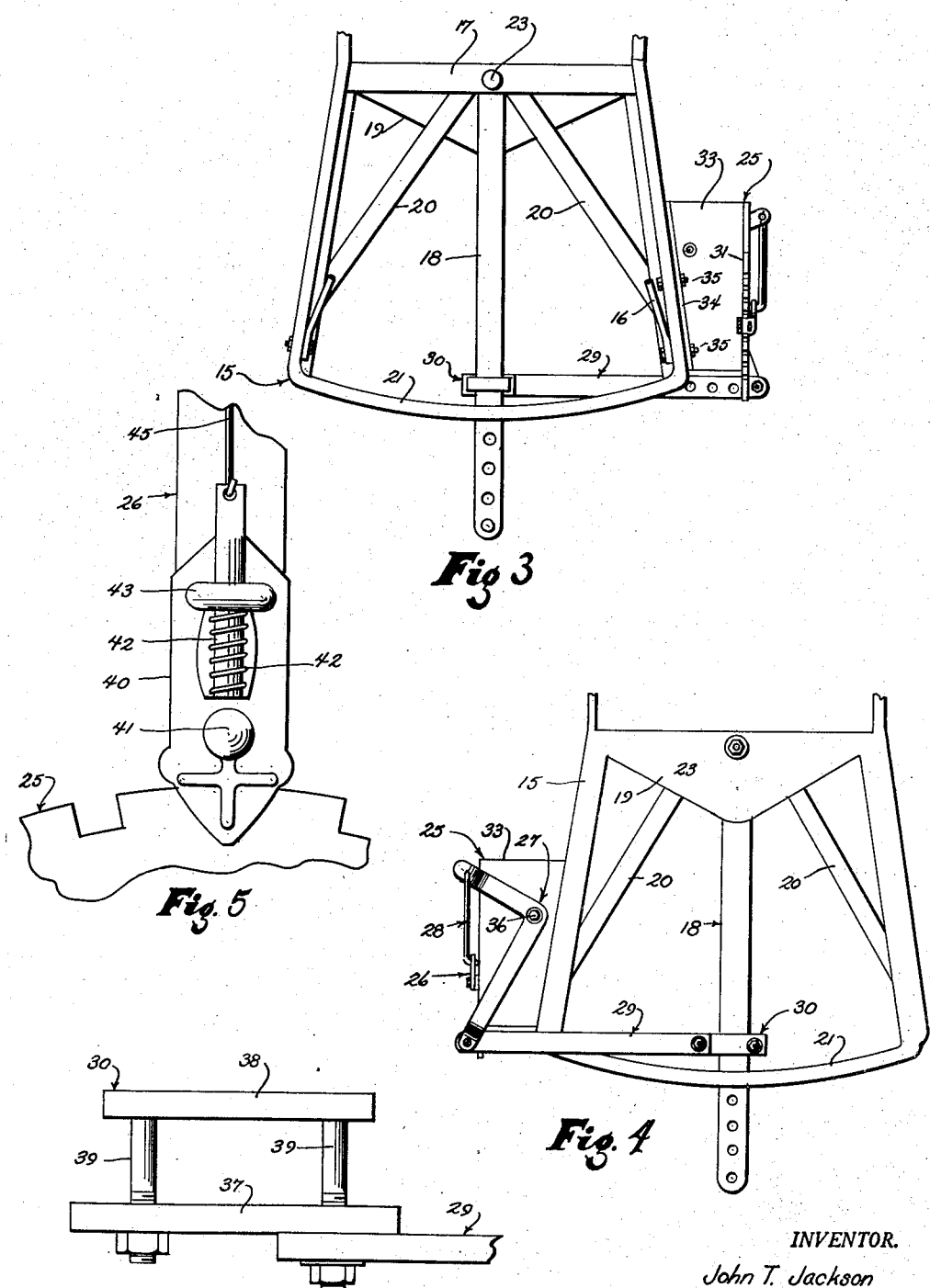
INVENTOR.
John T. Jackson Patented Oct. 10, 1950

2,525,357

UNITED STATES PATENT OFFICE 2,525,357

TRACTOR HITCH CONTROL

John T. Jackson, Viroqua, Wis.

Application October 7, 1949, Serial No. 120,073

1 Claim. (Cl. 280—33.44)

This invention relates to tractor hitches, and more particularly to a manually-operated control for holding the hitch bar of the tractor at one side or the other of the tractor draft line.

In towing farm implements with farm tractors, it is frequently necessary to pass transversely across the slope of a hill, particularly when the tractor and implement are following contour lines of the land. Under these conditions an implement, and particularly a plow, towed by the tractor, has a tendency to turn or "walk" slightly downhill, necessitating a compensating uphill inclination of the tractor. Under these conditions it is extremely difficult to maintain the tractor rear wheel adjacent the plowed area in the furrow, and at the same time maintain the proper width of furrow for the plow. With other implements, such as harrows, corn pickers, corn binders, hay balers and drills, it is also difficult to maintain both the tractor and the implement in the proper path.

An attempt has been made to overcome this difficulty by securing the tractor hitch bar to the supporting drawbar at a location spaced from the center of the drawbar or to one side of the draft line of the tractor. This has not proved satisfactory, however, as the slope of the land frequently changes and in order to obtain the desired result it would be necessary to stop the tractor and change the setting of the hitch bar for every change in the slope of the land. It would also be necessary to stop and change the hitch bar setting each time the tractor is turned around.

It is among the objects of the present invention to provide hitch-bar-setting control mechanism which can be operated by the tractor driver without stopping the tractor or leaving the tractor seat, to position the hitch bar selectively at either side of the draft line and at a distance from the draft line proportional to the slope of the land over which the tractor is traveling, which mechanism is simple and durable in construction, economical to manufacture, easy to install, and can be mounted on an existing tractor with no material modification of the tractor construction, and which is easy to operate and does not interfere, in any way, with the operation of the tractor or an implement towed thereby.

Other objects and advantages will become apparent from a consideration of the following description and the appended claim in conjunction with the accompanying drawings, wherein:

Figure 3 is a cross-sectional view on the line 3—3 of Figure 1;

Figure 4 is a bottom plan view of the tractor drawbar, hitch bar and the hitch-bar control illustrated in top plan view in Figure 3;

Figure 5 is an elevation of fragmentary portions of a quadrant and hand lever showing structural details of this part of the mechanism; and Figure 6 is an elevation of a clip used to attach the control mechanism to the hitch bar of the tractor.

Figure 1:
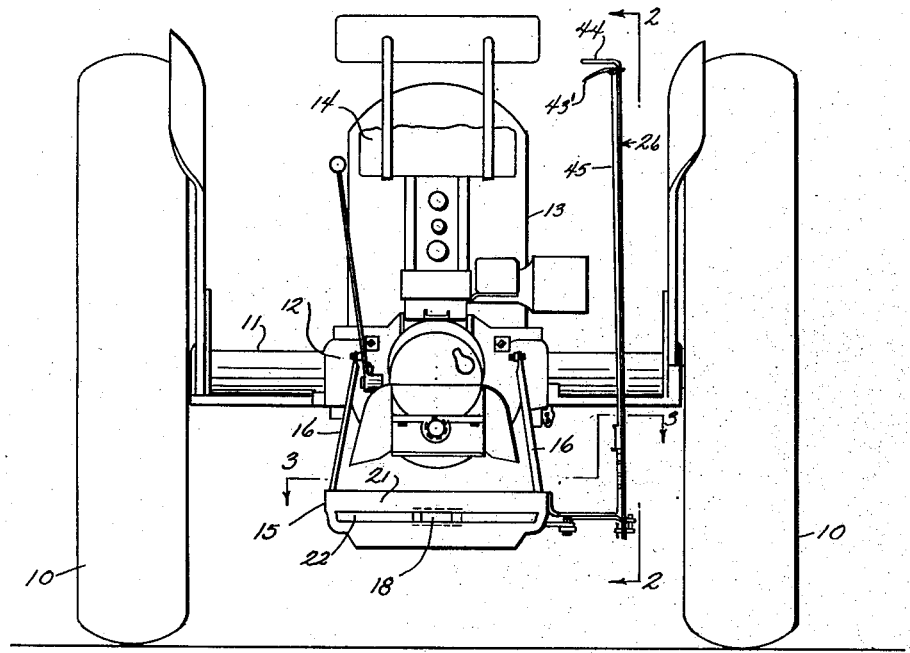
Figure 1 is a rear elevation of a farm tractor with a hitchbar control illustrative of the invention operatively assembled therewith.
Figure 2:
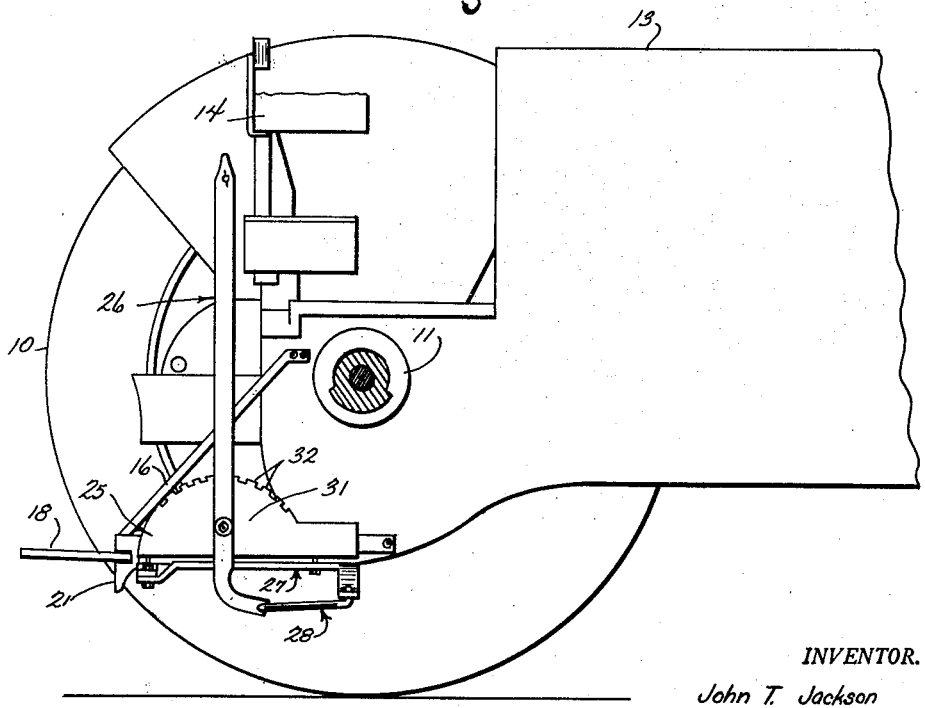
Figure 2 is a cross-sectional view on the line 2—2 of Figure 1.

With continued reference to the drawings, the tractor illustrated is of conventional construction and has a pair of rear wheels 10 supporting a rear axle 11, which rear axle includes the tractor differential mechanism 12, which differential mechanism is connected at its front end to the rear end of the tractor engine 13, and supports the driver's seat 14 of the tractor. A U-shaped drawbar structure 15 is pivotally connected at its forward end to the differential mechanism of the tractor, usually below the differential mechanism or rear axle, and is supported in operative position by braces 16 which are inclined upwardly and forwardly from the rear end of the drawbar and attached at their forward ends to the tractor differential mechanism above the attachment between the differential mechanism and the drawbar.

In the arrangement illustrated, a cross-member 17 extends transversely across the drawbar near the front end of the latter, and a hitch bar 18 is pivotally connected at its front end to the cross-bar 17 substantially at the mid-length location of the latter. The pivotal connection between the hitch bar and the cross-member 17 is reinforced by a triangular plate 19 extending transversely of the drawbar below the cross-member 17, and by two diagonal braces 20 which incline from adjacent the pivotal connection between the cross-member 17 and the hitch bar rearwardly and outwardly and are secured to the sides or legs of the U-shaped drawbar near the rearward ends of these legs, respectively. The rear end or bight 21 of the drawbar is provided with a longitudinally-extending slot 22 through which the hitch bar 18 projects at its rearward end, so that the hitch bar is supported by the relatively fixed drawbar for swinging movements about the pivotal connection 23 between the front end of the hitch bar and the transverse members 17 and 19.

The tractor construction so far described is old and well-known, and constitutes no part of the present invention, except in the combination thereof with the novel hitch-bar control mechanism of the present invention.

The hitch-bar control mechanism comprises, in general, a toothed quadrant 25 attachable to the drawbar 15 at one or the other side thereof, a hand lever 26 pivotally mounted intermediate its length on the quadrant 25, a bell crank 27 pivotally mounted at its angle on the quadrant 25, a link 28 connecting the lower end of the lever 26 to the distal end of one leg of the bell crank 27, a second link 29 connected at one end to the distal end of the other leg of the bell crank, and a clip 30 attached to the opposite end of the second link 29 and engageable with the hitch bar 18 of the tractor.

The quadrant 25 is formed of a piece of metal plate and includes a generally semi-circular portion 31 provided along its curved edge with spaced teeth 32, a generally rectangular-shaped base portion 33 joined to the straight edge of the semi-circular portion 31 and disposed at substantially right angles to the semi-circular portion, and a flange 34 along the edge of the base portion 33 opposite the semi-circular portion 31 and extending substantially perpendicularly from the base portion in the same direction in which the semi-circular or quadrant portion 31 extends. This flange 34 is provided with spaced-apart apertures which receive bolts 35 which extend through registering apertures in one leg of the U-shaped drawbar 15. Preferably, the quadrant is attached to the right-hand leg of the drawbar, as illustrated in the drawings, although it can be attached to the left-hand leg if desirable for the accommodation of a left-handed tractor operator.

The bell crank 27 is disposed below the base 33 of the quadrant when the quadrant is operatively assembled with the tractor drawbar, and is pivotally connected to the base at a location spaced inwardly and forwardly from the pivotal connection between the hand lever and the quadrant by a pivot bolt 36 which extends through registering apertures in the quadrant base 33 and the bell crank 27.

The link 28 may conveniently comprise a piece of metal rod having angularly-disposed end portions engaged in apertures in the lower end of the hand lever 26 and in one of the legs of the bell crank 27, respectively, and the second link 29 may conveniently comprise a straight metal bar having apertures near its opposite ends to receive bolts by means of which this link is pivotally connected to the other leg of the bell crank and to the clip 30.

The clip 30 comprises a base plate 37 having two spaced-apart apertures therethrough, a top plate 38 and two bolts 39 secured at their ends to the top plate 38 near respectively-opposite ends of the latter, and extending through the apertures in the base plate 37. The length of the bolts 39 and the distance therebetween are such that the hitch bar 18 is closely received between the bolts and between the top plate 38 and the base plate 37.

With this construction, when the hand lever 26 is swung forwardly and rearwardly about its pivotal connection with the quadrant 25, the bell crank 27 will be turned about the pivot bolt 36 to swing the hitch bar 18 laterally relative to the draft line of the tractor.

A detent housing 40 is secured to the lever 26 adjacent the curved edge of the quadrant 25 by suitable means, such as the bolt 41, and a detent 42 slidably mounted in this housing is engageable between the teeth of the quadrant to hold the lever 26 in adjusted position relative to the quadrant. The detent is resiliently urged into engagement with the quadrant teeth by compression spring 42 which surrounds the detent between a shoulder on the detent and an abutment 43 carried by the housing 40, and the detent is manually moved out of engagement with the quadrant teeth by a release lever 43' pivotally mounted at one end on the hand lever 26 near the inwardly-turned handle 44 at the upper end of the hand lever, and connected to the detent by the strand 45.

From the above description it is apparent that the improved hitch-bar control can be mounted on the tractor with only two connections to the tractor mechanism, that is, the connection between the quadrant 25 and the side of the drawbar and the clip connection between the link 29 and the hitch bar of the tractor. The quadrant including the semi-circular toothed portion, the base and the flange is a simple one-piece construction which supports both the hand lever and the bell crank, thus providing a device of maximum simplicity and economy which is easy to attach to a conventional tractor without any modification of the tractor construction and which is easy to operate from the driver's seat of the tractor.

The invention may be embodied in other specific forms without departing from the spirit or essential characteristics thereof. The present embodiment is, therefore, to be considered in all respects as illustrative and not restrictive, the scope of the invention being indicated by the appended claim rather than by the foregoing description, and all changes which come within the meaning and range of equivalency of the claim are, therefore, intended to be embraced therein.

What is claimed is:

A hitch-bar control for a tractor having a swingable hitch bar and a fixed drawbar supporting the hitch bar comprising a toothed quadrant attachable to the tractor drawbar at one side of the latter, a hand lever pivotally connected intermediate its length to said quadrant to extend upwardly therefrom, a manually-releasable detent carried by said lever and engageable with the teeth of said quadrant to hold said lever in adjusted position relative to the quadrant, a bell crank pivotally mounted at its angle to said quadrant, a first link connecting the lower end of said lever to the distal end of one leg of said bell crank, and a second link secured to the other leg of the bell crank for connecting the distal end of such other leg to the tractor hitch bar to move said hitch bar laterally relative to the tractor draft line upon pivotal movement of said hand lever relative to said quadrant, said quadrant comprising a plate structure including a substantially semi-circular quadrant portion, a base portion extending substantially perpendicularly from the straight edge of said substantially semi-circular portion, and a flange extending perpendicularly from the edge of said base portion opposite said semi-circular portion and in the same direction as said semi-circular portion, said flange having apertures therein for the reception of bolts for attaching said quadrant to the drawbar of a tractor.

JOHN T. JACKSON.

REFERENCES CITED

The following references are of record in the file of this patent:

UNITED STATES PATENTS

| Number | Name | Date |
|---|---|---|
| 1,313,677 | Dryer | Aug. 19, 1919 |
| 1,549,446 | Callender | Aug. 11, 1925 |
| 1,962,423 | Brown | June 12, 1934 |